Sept. 27, 1927.
N. GIANCOLA
1,643,410
LAPEL TURNER
Filed June 4, 1926
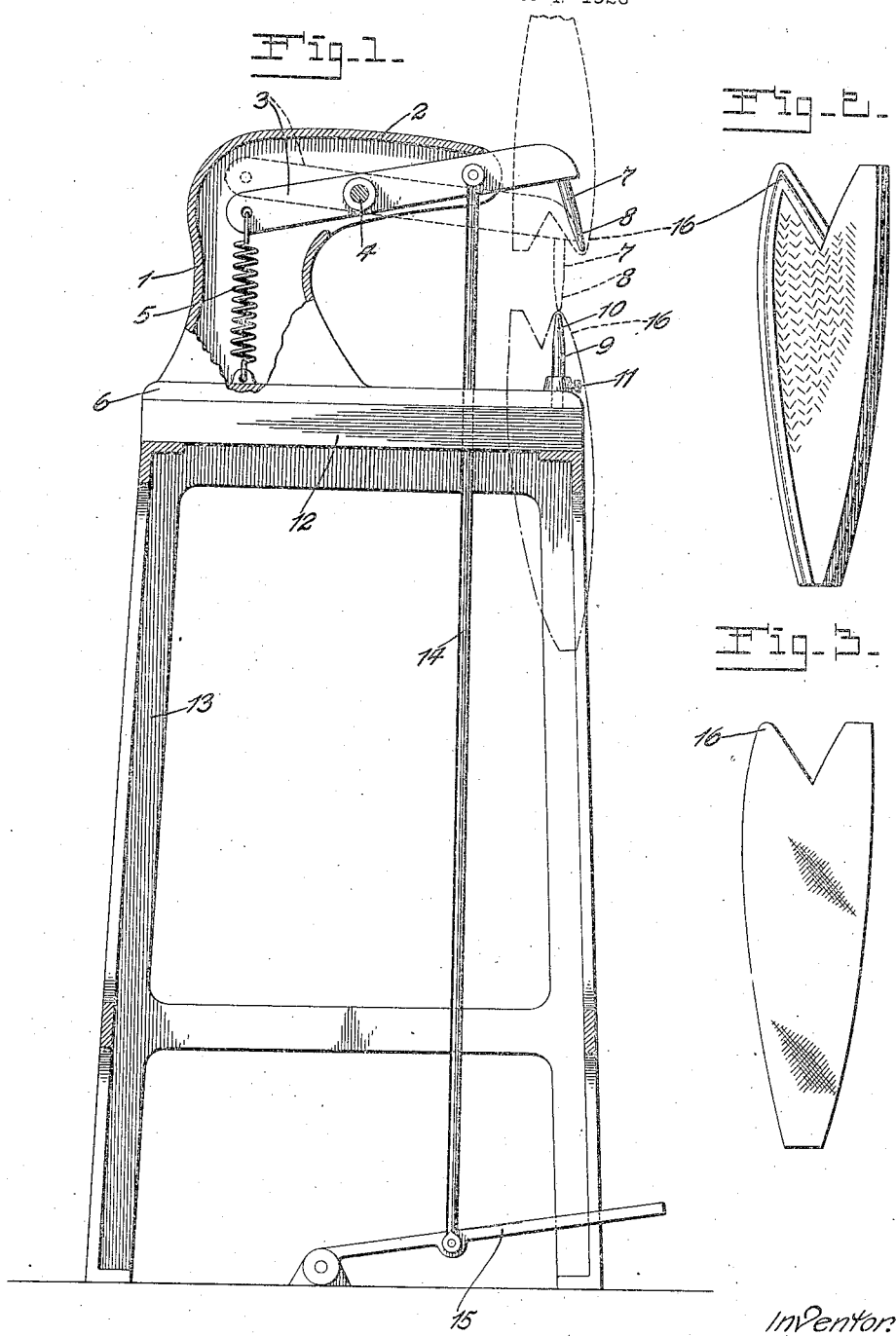
Inventor:
Nicholas Giancola,
by Rippey & Kingsland,
His Attorneys.

Patented Sept. 27, 1927.

1,643,410

UNITED STATES PATENT OFFICE.

NICHOLAS GIANCOLA, OF ST. LOUIS, MISSOURI, ASSIGNOR, BY DIRECT AND MESNE ASSIGNMENTS, OF ONE-THIRD TO JOHN REECE AND EDWARD H. BEHRLE AND ONE-SIXTH TO ROBERT L. McLARAN, ALL OF ST. LOUIS, MISSOURI.

LAPEL TURNER.

Application filed June 4, 1926. Serial No. 113,822.

This invention relates to a machine for turning coat lapels after the different pieces have been sewed together in reverse relationship, so as to place the raw edges of the different plies of material between the plies to provide a finished garment.

According to present practice, after the plies of material have been sewed together in reverse relationship in the manufacture of coat lapels, the plies are turned to proper relationship by an unsatisfactory method consisting in the manipulation of some implement, such as a pair of scissors or a stick of wood, which is placed against the corner of the lapel to force it to proper folded position while the different plies are being turned to proper relationship. By the present invention the time and expense required for these operations are greatly reduced and, by use of this invention, one person is able to accomplish as much as two or more persons can accomplish by the old method of procedure.

An object of the invention is to provide a machine comprising a pair of parts, one of which is arranged to extend between the plies of material forming a coat lapel while the parts are reversed from their finished relationship—that is while the parts are in the relationship which they have to each other immediately after being sewed together and before being turned; and which is arranged to be brought into cooperative relationship to the other part around and against which the lapel is easily turned and the corner expanded and extended to finished shape.

Other objects will appear from the following description, reference being made to the accompanying drawing in which Fig. 1 is a sectional view of the machine embodying the present invention.

Fig. 2 shows a coat lapel comprising a number of plies of material after they have been secured together and before the lapel is turned.

Fig. 3 shows the finished lapel after it has been turned.

The invention comprises a frame including an upright portion 1 and a laterally extended portion 2. This frame is preferably hollow so as to enclose a part of the operating devices. A lever 3 is mounted in the frame upon a pivot 4 extending transversely between the side walls of the hollow frame arm 2. The outer end and the lower portion of the frame arm 2 are slotted or open to permit operation of the lever 3 which extends beyond the end of said arm 2. A coiled spring 5 connects the inner end of the lever 3 with the base 6 with which the upright part 1 of the hollow frame is rigidly united. The base 6 extends outwardly beyond the plane of the end of the arm 2 so that the turning devices supported by the lever 3 and said base respectively may be brought into cooperative relationship to expedite and facilitate turning of the lapels.

A downwardly extending arm 7 is rigid with the outer exposed portion of the lever 3 and has a tapered extremity 8, the end of which is bluntly rounded. An upwardly extending arm 9 is secured to the base 6 and has its end portion 10 tapered and bluntly rounded at the end. The arms 7 and 9 are in such relationship to each other that when the outer end of the lever 3 is lowered the arm 7 is in approximately vertical continuation of the arm 9. The arm 9 may be releasably attached to the base 6 by a set screw element 11.

The base 6 is designed and adapted to be secured upon any suitable support as, for instance, upon the top 12 of a supporting frame 13. A link 14 has its upper end pivoted to the lever 3 outwardly from the pivot 4 and its lower end to a treddle lever 15.

In practice the lapel in the reverse condition of the plies thereof shown in Fig. 2 is applied to the lever 3 and the arm 7, as indicated by dotted lines Fig. 1, with the two plies of the lapel embracing the end of the lever 3 between them and the arm 7 extending downwardly into the lapel corner 16. Then the lever 3 is operated by means of the treddle connections 14—15, or otherwise, to the dotted line position (Fig. 1) wherein the arm 7 is in approximately longitudinal continuation of the arm 9. Next the plies of the lapel are turned and drawn downwardly with sufficient force to turn the lapel corner 16 properly entirely around the corner. This places the plies of material in proper finished relationship, as shown in Fig. 3, and the operation requires only a fraction of the time that is required to turn the lapel by manipulation of some implement according to present practice.

I am aware that the construction and arrangement of the parts may be varied without departure from the nature and principle of the invention, and do not restrict myself to specific or unessential features, but what I claim and desire to secure by Letters Patent is:—

1. In a machine of the character described, a housing frame comprising an overhanging arm, a lever pivoted in said arm, a spring enclosed within said housing frame for actuating said lever to one position, an arm attached to said lever outside of said frame, a connection from said lever between said second arm and said pivot for operating said lever in opposition to said spring, and a rigid arm in cooperative relationship to said arm on said lever.

2. In a machine of the character described, a housing frame comprising an overhanging arm, a pivot in said arm, a lever mounted on said pivot for vertical swinging movements, a spring in connection with said lever at one side of said pivot for operating said lever to one position, a rigid arm, an arm in connection with said lever, and an element connected with said lever between said last-named arm and said pivot for operating said lever in opposition to said spring to place said arm on said lever in approximate longitudinal continuation of said rigid arm.

3. In a machine of the character described, a housing frame comprising an overhanging arm, a lever pivoted in said arm, a spring in said frame for moving said lever to one position, a rigid arm, an arm rigid with said lever outside of said housing frame, and a device connected to said lever between said last-named arm and said pivot for moving said lever in opposition to said spring to place said arm on said lever in approximate longitudinal continuation of said rigid arm.

NICHOLAS GIANCOLA.